United States Patent [19]
Oaks, Jr.

[11] 3,830,469
[45] Aug. 20, 1974

[54] TIRE SPREADER DEVICE

[76] Inventor: John P. Oaks, Jr., 9202 Indianapolis Blvd., Highland, Ind. 46322

[22] Filed: Sept. 17, 1973

[21] Appl. No.: 398,095

[52] U.S. Cl. .............................................. 254/50.3
[51] Int. Cl. ........................................... B60c 25/14
[58] Field of Search .......................... 254/50.1–50.4

[56] References Cited
UNITED STATES PATENTS

| 2,347,311 | 4/1944 | Branick | 254/50.4 |
| 2,732,174 | 1/1956 | Kossman | 254/50.3 |
| 2,821,361 | 1/1958 | Marks | 254/50.3 |
| 2,855,180 | 10/1958 | Douglass | 254/50.3 |

Primary Examiner—Othell M. Simpson
Attorney, Agent, or Firm—Walter Leuca

[57] ABSTRACT

This invention comprises a generally rectangular frame having opposite sides thereof provided with roller means for rotatably supporting a tire positioned upright thereon. The other opposite sides of the frame are provided with spaced spreader arm means pivotally movable to engage and simultaneously spread the tire casing. This is accomplished by an air motor supported on the frame, activated to rectilinearly extend a drive rod which is distally connected to a lever bar fixed upright to one set of spreader arm means for pivotal movement thereof. The drive rod is also connected to a depending lever member which is horizontally linked to a downwardly extending lever bar connected to the other set of spreader arm means causing both spreader arm means to simultaneously pivot in opposite directions.

7 Claims, 4 Drawing Figures 3,830,469

TIRE SPREADER DEVICE

BACKGROUND OF THE INVENTION

1. Field of the Invention

This invention relates to a tire handling apparatus and more particulary to a tire spreading device.

2. Description of the Prior Art

In the art of repairing vehicle tires, the inside of tire casings are inspected to locate cuts, abrasions, punctures and ruptures. For this purpose and to repair such damage, it is necessary to spread the casing to obtain the necessary space to make the inspection and repair. Vehicle tires and especially truck tires are sturdily constructed and a great amount of force is required to spread the tire casing. The force required in some instances is beyond the ordinary manual strength of a repairman. Even with smaller tires which can be manually spread, the operation is a difficult one since the spreading must be accomplished at the same time the tire is rotated so that inspection of the inside casing of the tire may be circumferentially completed.

One of the disadvantages of the prior art practice is the tendency of the prior art devices to laterally shift the rotating plane of the tire when the spreading operation is accomplished. This generally results from the fact that one set of spreader members are stationary and the other set of spreader members are movable, thereby tending to laterally shift the tire which rests on support means of the apparatus. This tends to tip the tire over and must therefore, be manually supported during the spreading operations.

SUMMARY OF THE INVENTION

My invention includes a generally rectangular base; opposite sides of the base are provided with roller means for rotatably supporting a tire positioned upright thereon. The other opposite sides of the base are provided with spreader arm means pivotally movable to engage and simultaneously spread the tire casing. This is accomplished by an air motor supported on the frame, and activated to rectilinearly extend a drive rod which is distally connected to a lever bar fixed upright to one set of spreader arm means for pivotal movement thereof. The drive rod is also connected to a depending lever member which is horizontally linked to a downwardly extending lever bar connected to the other set of spreader arm means causing both spreader arm means to simultaneously pivot in opposite directions.

One of the advantages of my apparatus is that it is simple and economical to construct and the lever arrangement is such that a single air motor can be used to simultaneously move both sets of spreader members in opposite directions.

Other objects and advantages will become apparent after a more careful study of the following description taken together with the accompanying drawings in which is illustrated a preferred embodiment of my invention.

DESCRIPTION OF THE PREFERRED EMBODIMENT

Figure 1:
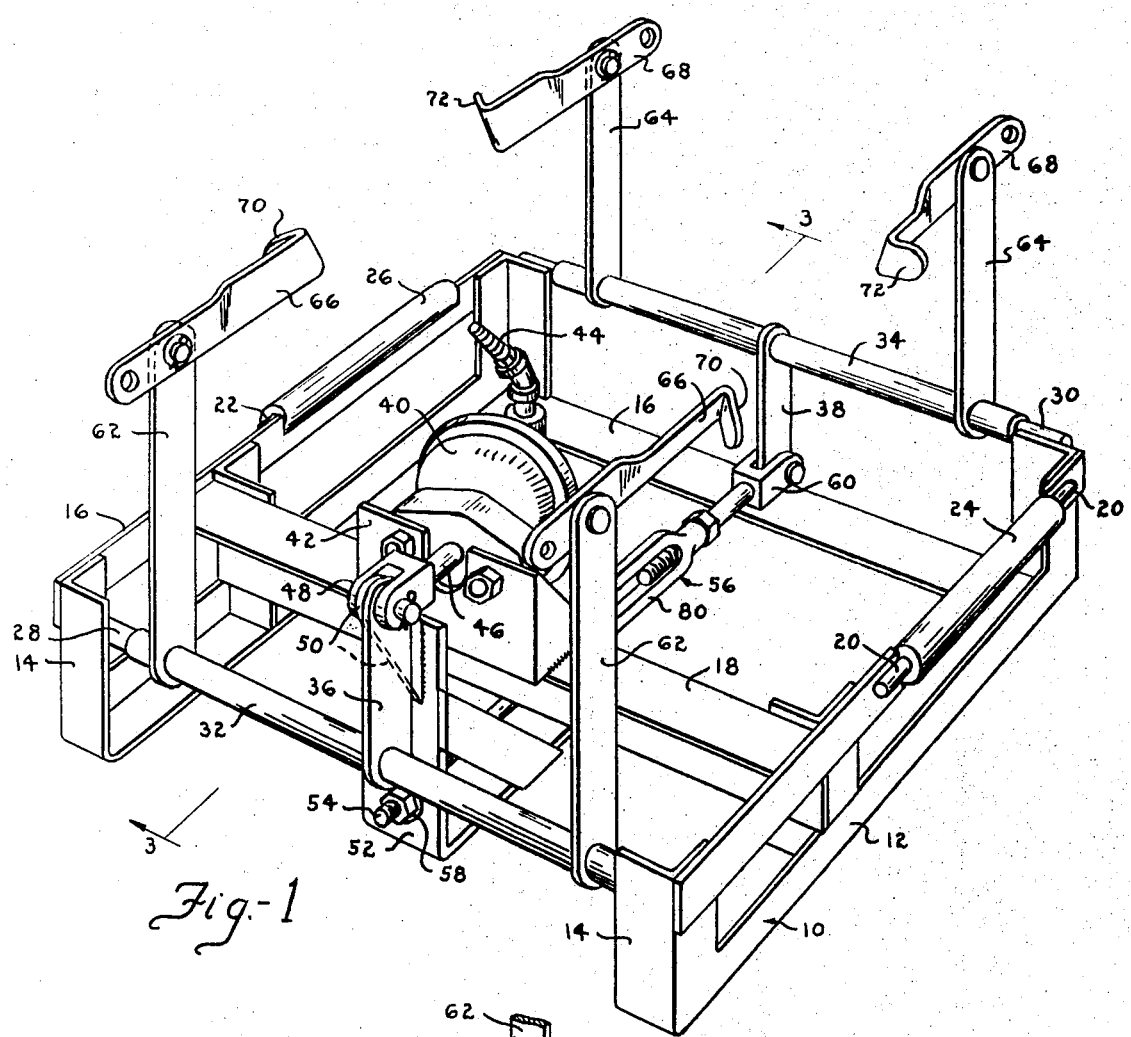
FIG. 1 is a perspective view of the tire spreader device of my invention.
Figure 2:
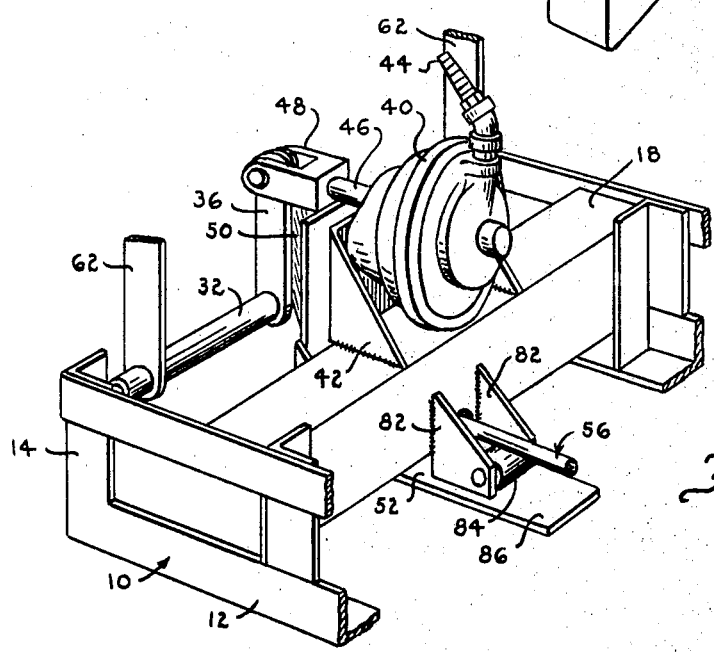
FIG. 2 is a perspective view of a fragmented part of this invention to better illustrate the air motor and link members viewed at an angle 90° removed from that of FIG. 1.

Referring now more particularly to the drawings, reference numeral 10 designates generally the tire spreader device of my invention. It comprises a base frame 12 fabricated from angle bar members and bar plates such as 14 and 16 respectively to form a generally rectangularly sided frame structure. I provide an angle bar member 18 connected to opposite sides of frame 12 bridging the frame structure for supporting an air motor. It is to be understood that the connective means where not described may be any convenient means, such as welding or bolt and nut assembly. Also provided on opposite sides of frame 12 are axle shafts 20 and 22 which rotatably support rollers 24 and 26 respectively. Rollers 24 and 26 rotate on shaft 20 and 22 respectively and serve to rotatably support an upstanding tire positioned thereon. Horizontal rods 28 and 30 are connected at their ends to corner upright members 14 of frame 12. Rotatably fitted on rods 28 and 30 are sleeve shafts 32 and 34 respectively. Lever bars 36 and 38 are connected to sleeve shafts 32 and 34 respectively, one thereof being positioned upright on shaft 32 and the other thereof depending downward on shaft 34, both being centrally positioned thereon. For motive means, I provide a single stroke air motor 40 supported on bracket 42 which is mounted on angle bar 18 bridging frame 12. Air motor 40 is a diaphragm-type air cylinder operated by compressed air commonly provided in automobile service stations. The compressed air hose 43 (FIG. 3) is connected to nipple 44 of air motor 40 and the air, when turned on by a hand valve (not shown) acts against the diaphragm in air motor 40 to rectilinearly move drive rod 46 outwardly for the power stroke. When the air pressure is turned off, the resiliency of the diaphragm returning to its normal position together with the return action of the spread tire casing, accomplishes the return of air motor drive rod 46 and the spreader means to their normal positions. Clevis 48 is connected to the end of drive rod 46 and is jointly pinned to lever bar 36 and tongue member 50 projecting from the upright end of right angle lever member 52. Also provided in the upright end of lever member 52, is a hole through which threaded end 54 of transverse link 56 is connected by nut means 58. Lever bar 38 is positioned vertically downward from sleeve shaft 34 and the lower end thereof is connected to the other end of transverse link 56 by any convenient means such as clevis member 60.

Figure 3:
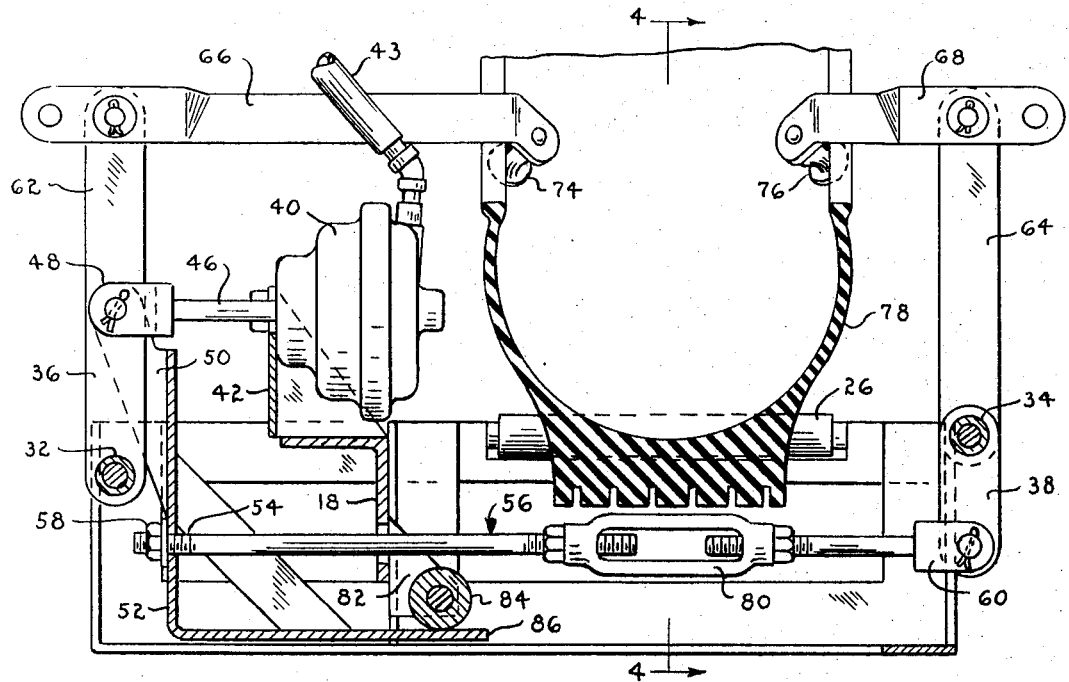
FIG. 3 is a cross section of the tire spreader of my invention taken along lines 3—3 of FIG. 1; a portion of a tire is illustrated in section in operative relation with the spreader arms of this invention, and rollers are provided on the distal ends of the spreader arms as a modification to the spreader arms illustrated in FIG. 1.
Figure 4:
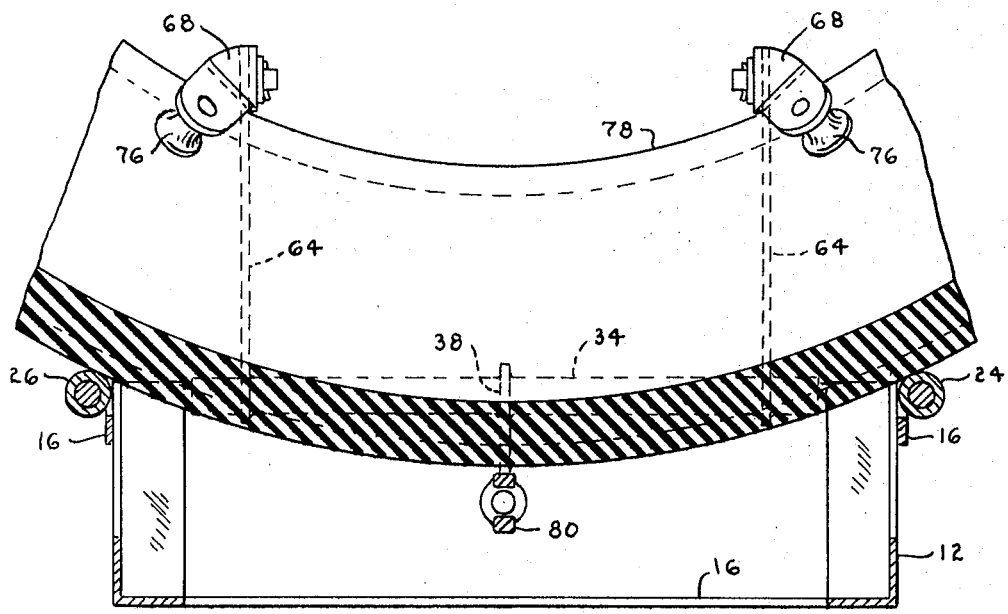
FIG. 4 is a section elevation of the tire and spreader taken along lines 4—4 of FIG. 3.

I further provide a pair of lever bars 62 connected to sleeve shaft 32 adjacent opposite ends thereof in a normally upright position thereon. A second pair of lever bars 64 is similarly connected to sleeve shaft 34, each of the pair of lever bars 62 and 64 being in lateral alignment. The top ends of lever bars 62 and 64 pivotally support spreader arms 66 and 68 respectively. The distal ends 70 and 72 of spreader arms 66 and 68, may be angled as shown in FIG. 1 to hook onto the bead edge of the tire casing or may be provided with rolls 74 and 76 axially supported thereon for rotation as shown in FIGS. 3 and 4. Rolls 74 and 76 are adapted to engage the bead edge of tire casing 78 and rotate as tire 78 is rotated. I prefer to make transverse link 56 in two parts, the ends thereof 54 and 60 being threaded to connect to turnbuckle 80 which functions to adjustably shorten or lengthen transverse link 56 to position the distal ends of spreader arms 66 and 68 closely against the bead edge of the tire.

The pivot ends of spreader arms 66 and 68 may further be provided with additional pivot holes, to lengthen or shorten, as the case may be, the distal reach of spreader arms 66 and 68 so that the device of my invention may accommodate different width tires.

Provided on the drop side of angle bar member 18 are bracket plates 82 spaced to rotatably support therebetween roll 84 which bears against the horizontal leg 86 of right angle lever member 52. Roll 84 serves to stabilize lever member 52 as it reciprocally moves with drive rod 46 and thereby prevents tilting thereof since the points connecting drive rod 46 and transverse link end 54 are substantially offset.

In the operation of my invention, I mount tire 78 which is to be inspected or repaired, upright on support rolls 24 and 26, as shown in FIGS. 3 and 4. Previous thereto I adjustably rotate turnbuckle 80 to increase or decrease the length of transverse link 56 so that rolls 74 and 76 mounted on the distal ends of spreader arms 66 and 68, respectively, are fitted against the inside edges of tire 78. Thus mounted upright, tire 78 may be easily rolled. In order to spread the casing of tire 78, an air valve (not shown) commonly connected to air compressor hose 43, is opened permitting air to enter air motor 40 acting against the pressure side of the diaphragm thereof. Drive rod 46 connected to the air motor diaphragm moves outwardly, pivoting lever bar 36 to which it is connected by means of clevis 48, rotating sleeve shaft 32 thereby effecting the pivoting of lever bars 62 counterclockwise when viewing FIG. 3. The power stroke of drive rod 46 also moves right angle lever member 52 which is also connected to clevis 48 by means of tongue member 50. The motion of right angle lever member 52 is rectilinear and serves to move transverse link 56 to the left as viewed in FIG. 3, pivoting lever bars 64 clockwise as viewed in FIG. 3. Lever bars 36 positioned upright on sleeve shaft 32 and lever bar 38 depending downward from sleeve shaft 34 will be caused to pivot counterclockwise and clockwise respectively. This lever arrangement of my invention will cause spreader arms 66 and 68 to spread both edges of the casing of tire 78 simultaneously in opposite directions. The tire casing being spread apart, may be inspected interiorly while rotated and repaired where required. When the inspecting or repair operation is completed, the air valve is operated to release the air pressure against the diaphragm in air motor 40. The resiliency of the tire casing will cause its return to its normal position which action will pull spreader arms 66 and 68 together and lever bars 36 and 38 will return to their normal upright and depending position respectively, allowing spreader arms 66 and 68 to be removed from the tire. As previously stated, I provide additional holes in the pivot ends of spreader arms 66 and 68 to adjust the space between the distal ends of opposing spreader arms 66 and 68 to accommodate the casing edge spread that cannot be adjusted for by turnbuckle 80.

It is now apparent from the above description and drawings that my invention is a simple and economical to manufacture tire spreader apparatus which may be easily adjusted to accommodate different size tires, and which accomplishes the tire spreading operation simultaneously in opposite directions.

I claim:

1. A tire spreader device comprising:
a rectangular frame;
means on opposite sides of said rectangular frame for rotatably supporting a tire upright;
means pivotable on other opposite sides of said rectangular frame for spreading the casing of said tire;

a lever bar extending upright on said means pivotable for spreading said casing of said tire, and another lever bar extending downward from said other of said means pivotable for spreading said casing of said tire;
motor means supported on said frame;
an extensible rod member of said motor means connecting said upright lever to pivot said means pivotable for spreading said casing of said tire;
a member rigidly depending from said rod member; and
link means connecting at one end thereof said member rigidly depending from said rod member, and at the other end thereof connecting said downward extending lever.

2. A tire spreader device comprising:
a supportive frame having rectangularly disposed sides;
roller means on opposite sides of said rectangular frame for supporting a tire upright between said rectangularly disposed sides;
rod members forming the other opposite sides of said rectangular frame, and spreader means pivotable on said rod members for engaging the casing of said tire;
an upright lever connecting one of said spreader means, and a downward lever connecting the other of said spreader means;
drive means on said frame;
a rod member connecting said upright lever extensibly movable by said drive means;
a depending right angled member connecting said rod member;
link means connecting at one end thereof said depending member and at the other end thereof connecting said downward lever; and
a roller member supported on said frame for engaging said depending right angled member.

3. The tire spreader of claim 2 where said link means is further characterized as being longitudinally adjustable.

4. The tire spreader of claim 2 wherein said roller member is further characterized as engaging the horizontal leg of said depending right angled member.

5. A tire spreader device comprising:
a supportive frame having rectangularly disposed sides;
roller means on opposite sides of said rectangular frame for supporting a tire upright between said rectangularly disposed sides;

means pivotable on other opposite sides of said rectangular frame for spreading the casing of said tire;

an upright lever connecting one of said means pivotable for spreading said casing of said tire, and a downward lever connecting the other of said means pivotable for spreading said casing of said tire;

motor means supported on said frame;

a rod member rectilinearly movable by said motor means connected to said upright lever to pivot said means pivotable for spreading said casing of said tire;

a bracket shaped member rigidly depending from said rod member;

link means connecting at one end thereof said bracket shaped member rigidly depending from said rod member and at the other end thereof connecting said downward lever; and means fixed on said frame rotatably supporting a roll against said horizontal leg of said bracket shaped member.

6. A tire spreader device comprising:

a supportive frame having rectangularly disposed sides;

means on said opposite sides of said rectangular frame for rotatably supporting said tire upright;

rod members forming the other opposite sides of said rectangular frame, and means pivotable on said rod members for spreading the casing of said tire;

a lever bar on said means pivotable for spreading said casing of said tire, extending upright;

a lever bar on said other of said means pivotable for spreading said casing of said tire, extending downward;

drive means on said frame;

a rod member extensibly movable by said drive means connecting said upright lever for pivoting said means pivotable for spreading said casing of said tire;

a bracket shaped member rigidly depending from said rod member;

a longitudinally adjustable bar member connecting at one end thereof the vertical leg of said bracket shaped member, and at the other end thereof connecting said lever bar extending downward; and a roller member supported on said frame for engaging the horizontal leg of said bracket shaped member.

7. A tire spreader device comprising:

a rectangular frame;

roller means on opposite sides of said rectangular frame for supporting a tire upright;

means pivotable on other opposite sides of said rectangular frame for spreading the casing of said tire;

an upright lever connecting one of said means pivotable for spreading said casing of said tire, and a downward lever connecting the other of said means pivotable for spreading said casing of said tire;

motor means supported on said frame;

an extensible rod member of said motor means connecting said upright lever to pivot said means pivotable for spreading said casing of said tire;

a member rigidly depending from said rod member; and link means connecting at one end thereof said member rigidly depending from said rod member and at the other end thereof connecting said downward lever.

* * * * *